Oct. 19, 1937.  O. BOISVERT  2,096,666
SAW GUARD
Filed Oct. 28, 1936   2 Sheets-Sheet 1
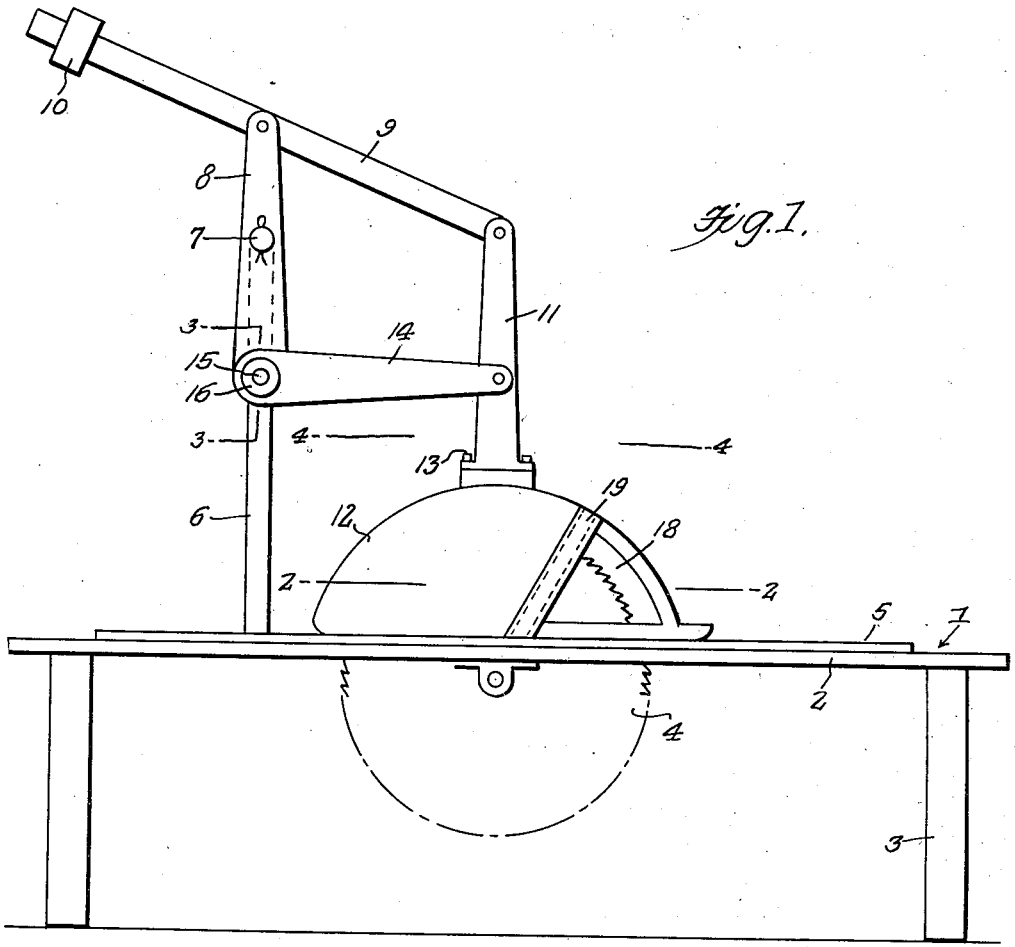
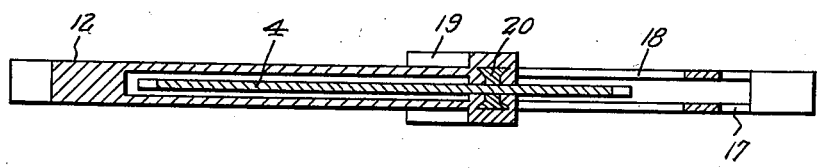
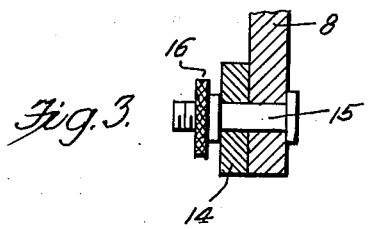
Inventor
*Onesime Boisvert*,
By *Clarence A. O'Brien*
*Hyman Berman*
Attorneys Oct. 19, 1937.  O. BOISVERT  2,096,666
SAW GUARD
Filed Oct. 28, 1936  2 Sheets-Sheet 2

Inventor
Onesime Boisvert,

By Clarence A. O'Brien
Hyman Berman
Attorney.

Patented Oct. 19, 1937

2,096,666

UNITED STATES PATENT OFFICE 2,096,666

SAW GUARD

Onèsime Boisvert, East Providence, R. I.

Application October 28, 1936, Serial No. 108,073

1 Claim. (Cl. 143—159)

The present invention relates to new and useful improvements in guards for circular saws and has for its primary object to provide, in a manner as hereinafter set forth, a device of this character embodying novel means for preventing cut wood, sawdust, chippings, etc., from flying into the face of the operator, thereby materially reducing the danger of injury while at the same time permitting the work to be more clearly observed and increasing efficiency in general.

Another very important object of the invention is to provide a saw guard of the aforementioned character embodying a novel adjustable supporting structure.

Other objects of the invention are to provide a circular saw guard which will be comparatively simple in construction, strong, durable, reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation, showing a saw constructed in accordance with the present invention.

Fig. 2 is a view in horizontal section, taken substantially on the line 2—2 of Fig. 1.

Fig. 3 is a detail view in vertical section, taken substantially on the line 3—3 of Fig. 1.

Figure 4:
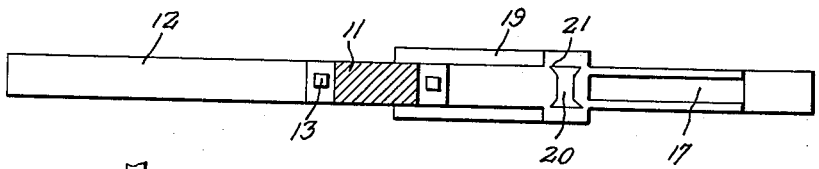
Fig. 4 is a horizontal sectional view, taken substantially on the line 4—4 of Fig. 1.
Figure 5:
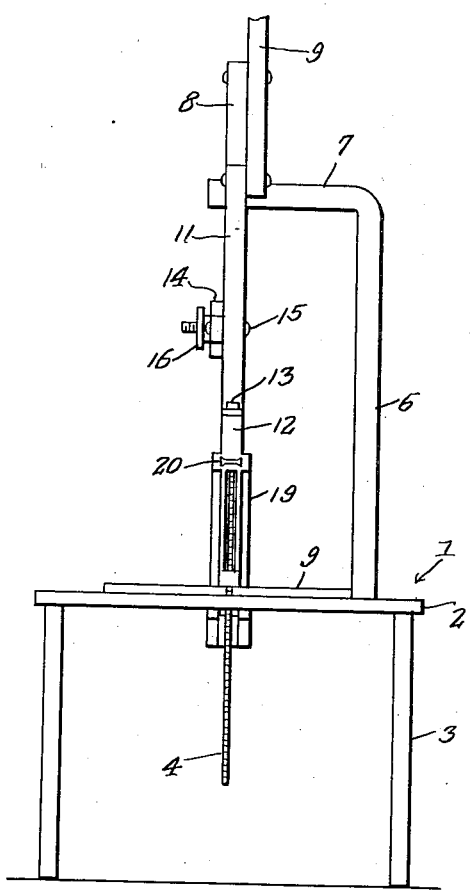
Fig. 5 is a view in front elevation of the invention.
Figure 6:
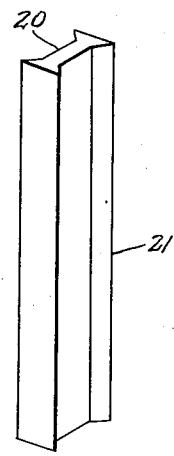
Fig. 6 is a detail view in perspective of the wood shield.

Referring now to the drawings in detail, it will be seen that the reference numeral 1 designates generally a conventional table, said table including a top 2 which is provided with suitable supporting legs 3. Journalled beneath the top 2 of the table 1 is a circular saw 4 which is operable in the usual longitudinal slot which is provided therefor in said top 2. The reference numeral 5 designates a piece of work on the table 1.

Fixed on the table 1 and rising therefrom is a post 6 having a horizontally extending upper end portion 7. Journalled at an intermediate point for swinging movement in a vertical plane on the horizontal upper portion 7 of the post 6 is a lever 8. The reference numeral 9 designates a lever which is pivotally mounted, at an intermediate point, on the upper end portion of the lever 8. Adjustably mounted on one end portion of the lever 9 is a counterweight 10. Pivotally suspended from the other end portion of the lever 9 is a hanger 11 on the lower end of which a guard 12 for the saw 4 is secured, as at 13. Of course, the guard 12 is adapted to substantially enclose and shield the portion of the saw 4 which projects above the table top 2. A link 14 has one end pivotally connected to the hanger 11 at an intermediate point on said hanger. The other end of the link 14 is pivotally and adjustably connected to the lower end portion of the lever 8 by a bolt 15 (see Fig. 3) which is equipped with a thumb nut 16.

In its front end the guard 12 is provided with an opening 17 through which the operator may observe the usual marks on the piece of work as it is fed up to the saw. The front portion of the guard 12 is provided with side openings 18 through which the operator may observe the marks on the work from either side.

The guard 12 further includes an inclined guide 19 immediately adjacent the side openings 18 for the reception of a shield 20 of suitable material, preferably wood. It will be noted that the shield 20 include dove-tails 21 on its vertical edges and the chamber in the guide 19 is shaped to accommodate said dove-tails, as illustrated to advantage in Fig. 2 of the drawings.

In use, the guard 12 is raised above the saw 4 sufficiently to permit the shield 20 to be inserted in position in the guide 19. The guard 12 is then lowered over the saw, said saw cutting a slot in the shield 20 from the lower end thereof. Then, sawdust, chippings, etc., which are carried around by the saw 4 and ordinarily thrown through the openings 17 and 18, will be arrested by the inclined shield 20 in a manner which is thought to be apparent. By loosening the thumb nut 16 the guard 12 may be adjusted as desired and frictionally secured in adjusted position by simply tightening said thumb nut again.

It is believed that the many advantages of a saw guard constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

A saw guard comprising a post including a horizontally extending upper end portion, a lever pivotally mounted, at an intermediate point, on the horizontal portion of the post, a second lever pivotally mounted, at an intermediate point, on one end of the first-named lever, a counterweight on one end portion of the second-named lever, a hanger pivotally suspended from the other end portion of the second-named lever, a guard mounted on the lower end of the hanger, a link pivotally connected at one end to the hanger, and means for connecting the other end of the link to the first-named lever for pivotal adjustment.

ONÈSIME BOISVERT.